(12) United States Patent
Ross et al.

(10) Patent No.: US 8,336,411 B2
(45) Date of Patent: *Dec. 25, 2012

(54) DUAL CLUTCH MULTI-SPEED TRANSMISSION

(75) Inventors: Craig S. Ross, Ypsilanti, MI (US); Elizabeth I. Wooden, Farmington Hills, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 319 days.

This patent is subject to a terminal disclaimer.

(21) Appl. No.: 12/705,326

(22) Filed: Feb. 12, 2010

(65) Prior Publication Data

US 2010/0236344 A1 Sep. 23, 2010

Related U.S. Application Data

(60) Provisional application No. 61/161,975, filed on Mar. 20, 2009.

(51) Int. Cl.
*F16H 3/08* (2006.01)

(52) U.S. Cl. .......................... 74/330; 74/331

(58) Field of Classification Search .................. 74/330, 74/333, 340
See application file for complete search history.

(56) References Cited

U.S. PATENT DOCUMENTS

| | | | |
|---|---|---|---|
| 6,250,171 B1 * | 6/2001 | Sperber et al. | 74/331 |
| 6,860,168 B1 | 3/2005 | Kobayashi | |
| 7,004,044 B2 * | 2/2006 | Hosono | 74/339 |
| 7,225,696 B2 * | 6/2007 | Gitt | 74/340 |
| 7,272,986 B2 | 9/2007 | Janson | |
| 7,832,299 B2 * | 11/2010 | Kobayashi et al. | 74/330 |
| 2005/0193848 A1 * | 9/2005 | Gitt | 74/340 |
| 2008/0134818 A1 * | 6/2008 | Gitt | 74/330 |
| 2008/0202268 A1 * | 8/2008 | Carey et al. | 74/331 |
| 2010/0251844 A1 * | 10/2010 | Ross et al. | 74/340 |
| 2010/0269607 A1 * | 10/2010 | Ross et al. | 74/330 |
| 2010/0269609 A1 * | 10/2010 | Ross et al. | 74/330 |

* cited by examiner

*Primary Examiner* — Ha D. Ho

(57) ABSTRACT

A transmission includes an input member, an output transfer gear, first and second shaft or transmission input members, first and second counter shaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

15 Claims, 1 Drawing Sheet

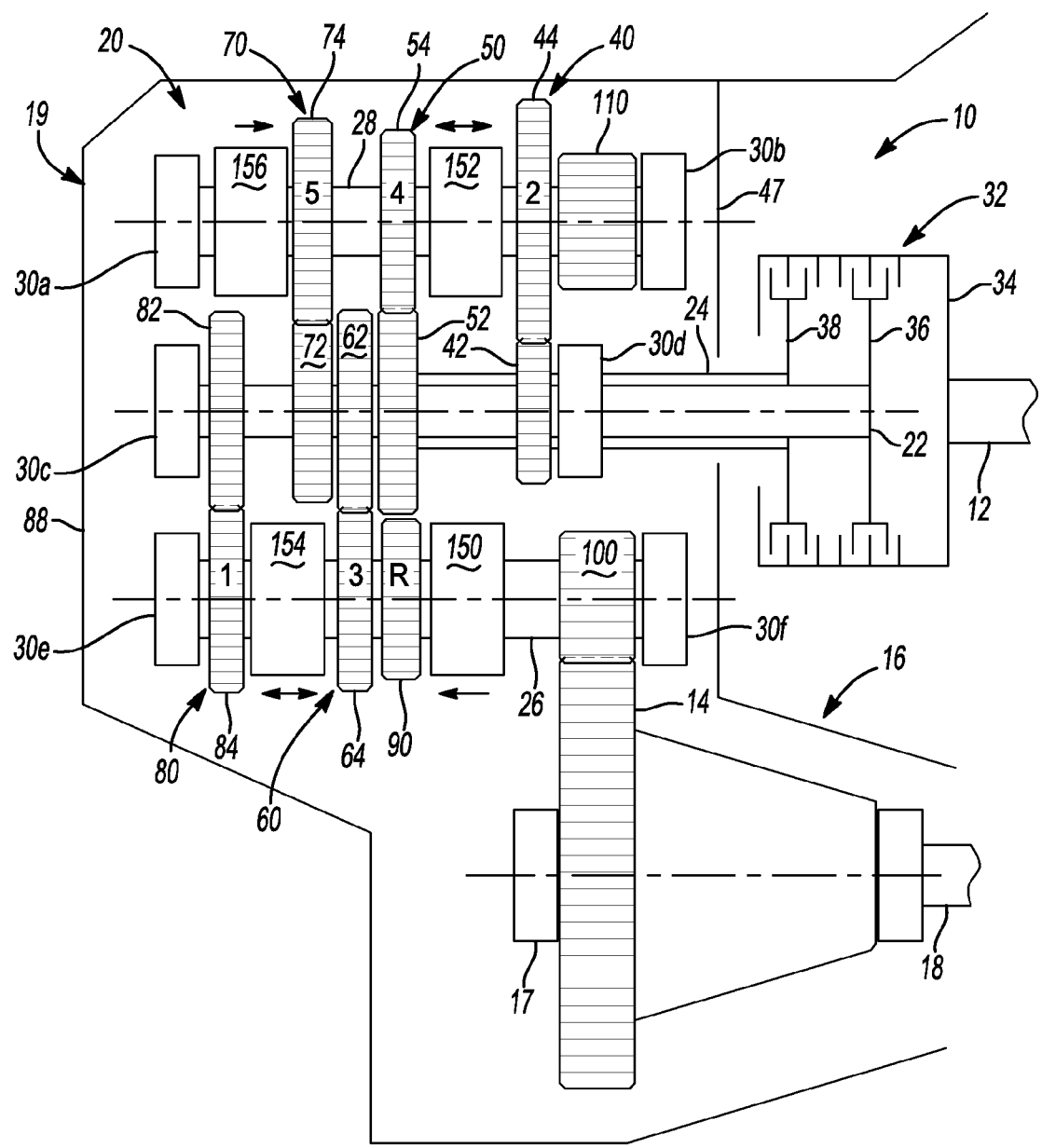

DUAL CLUTCH MULTI-SPEED TRANSMISSION

CROSS-REFERENCE TO RELATED APPLICATIONS

This application claims the benefit of U.S. Provisional Application No. 61/161,975, filed on Mar. 20, 2009, which is hereby incorporated in its entirety herein by reference.

TECHNICAL FIELD

The present disclosure relates to transmissions and more particularly to a compact, dual clutch multiple speed transmission having three axes to establish five or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output transfer gear.

In one aspect of the present invention, the transmission includes five co-planar gear sets.

In yet another aspect of the present invention, the transmission includes four synchronizer assemblies.

In yet another aspect of the present invention, the four synchronizer assemblies include two one-way synchronizers and two two-way synchronizers.

In yet another aspect of the present invention, the transmission is operable to provide at least five forward speed ratios.

In yet another aspect of the present invention, a dual clutch transmission is provided having a transmission housing, five gear sets, first and second transmission input members, a dual clutch assembly, first and second countershafts and fourth synchronizer assemblies.

In still another aspect of the present invention, the first gear set includes a first gear in mesh with a second gear. The second gear set includes a first gear in mesh with a second gear and a third gear in mesh with the second gear. The third gear set includes a first gear in mesh with a second gear. The fourth gear set includes a first gear in mesh with a second gear. The fifth gear set includes a first gear in mesh with a second gear.

In still another aspect of the present invention, the first transmission input member has a first end and a second end portion rotatably supported in the transmission housing. Each of the first gear of the third, fourth and fifth gear sets are rotatably fixed for common rotation with the first transmission input member. The second transmission input member has a first end portion rotatably supported in the transmission housing. Each of the first gear of the first and second gear sets are rotatably fixed for common rotation with the second transmission input member. The second transmission input member is concentric with the first transmission input member and at least partially surrounds the first transmission input member.

In still another aspect of the present invention, the dual clutch assembly has a clutch housing connectable to a flywheel of an engine. Moreover, the dual clutch assembly has a first clutch configured to selectively connect the clutch housing to the first transmission input member and a second clutch configured to selectively connect the clutch housing to the second transmission input member. The clutch housing is rotationally supported within the transmission housing.

In still another aspect of the present invention, the first countershaft is rotatably supported within the transmission housing and is spaced apart from and parallel with the first and second transmission input members. The third gear of the second gear set, the second gear of the third gear set and the second gear of the fifth gear set are each selectively connectable for common rotation with the first countershaft. The second countershaft is rotatably supported within the transmission housing and is spaced apart from and parallel with the first and second transmission input members. The second gear of the first gear set, the second gear of the second gear set and the second gear of the fourth gear set are each selectively connectable for common rotation with the second countershaft.

In still another aspect of the present invention, the first synchronizer assembly is configured to selectively connect the third gear of the second gear set to the first countershaft to establish a reverse gear ratio when the second clutch of the dual clutch assembly is engaged to connect the clutch housing of the dual clutch to the second transmission input member.

In still another aspect of the present invention, the second synchronizer is configured to selectively connect the second gear of the first gear set to the second countershaft to establish a second gear ratio and the second gear of the second gear set to the second countershaft to establish a fourth gear ratio when the second clutch of the dual clutch assembly is engaged to connect the clutch housing of the dual clutch to the second transmission input member.

In still another aspect of the present invention, the third synchronizer assembly is configured to selectively connect the second gear of the fifth gear set to the first countershaft to establish a first gear ratio and the second gear of the third gear set to the first countershaft to establish a third gear ratio when the first clutch of the dual clutch assembly is engaged to connect the clutch housing of the dual clutch to the first transmission input member.

In still another aspect of the present invention, the fourth synchronizer assembly is configured to selectively connect the second gear of the fourth gear set to the second countershaft to establish a fifth gear ratio when the first clutch of the dual clutch assembly is engaged to connect the clutch housing of the dual clutch to the first transmission input member.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a schematic view of an embodiment of a transmission in accordance with the present invention.

DESCRIPTION

Referring to FIG. 1, a multiple speed transmission is generally indicated by reference number 10. The transmission 10 connectable to an engine input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine (not shown) or other torque producing machine to provide a driving torque to input member 12. The output member or gear 14 rotatably drives a final drive assembly 16. The final drive assembly 16 transfers torque delivered by output member 14 to first and second side axles 17, 18, and on to road wheels (not shown) coupled to side axles 17, 18.

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first shaft or transmission input member 22, a second shaft or transmission input or transmission input member 24, a first countershaft 26, and a second countershaft 28. The second shaft or transmission input or transmission input member 24 is a sleeve shaft that is concentric with and overlies the first shaft or transmission input member 22. The first countershaft 26 and the second countershaft 28 are each spaced apart from and parallel with the first and second shaft or transmission input members 22, 24. The first and second shafts or transmission input members 22, 24 define a first axis of rotation, the first countershaft 26 defines a second axis of rotation and the second countershaft 28 defines a third axis of rotation. Shaft members 22, 24, the first and second countershafts 26, 28 are rotatably supported by bearings 30a, 30b, 30c, 30d, 30e and 30f.

A dual clutch assembly 32 is connected between the input member 12 and the first and second shaft or transmission input members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first shaft or transmission input member 22 and the clutch element 38 is connected for common rotation with the second shaft or transmission input member 24. Thus, selective engagement of clutch element 36 with the clutch housing 34 connects the input member 12 for common rotation with the first shaft or transmission input member 22. Selective engagement of clutch element 38 with the clutch housing 34 connects the input member 12 for common rotation with the second shaft member 24.

The gearing arrangement 20 also includes a plurality of co-planar, intermeshing gear sets 40, 50, 60, 70 and 80. Co-planar gear set 40 includes gear 42 and gear 44. Gear 42 is rotatably fixed and connected for common rotation with the second shaft or transmission input member 24. Gear 44 is selectively connectable for common rotation with the second countershaft member 28 and intermeshes with gear 42. It should be appreciated that gear 42 may be a separate gear structure fixed to the second shaft or transmission input member 24 or gear teeth/splines formed on an outer surface of the second shaft or transmission input member 24 without departing from the scope of the present invention. Gear set 40 is disposed adjacent a wall 47 of the transmission housing 19 that is on a front or side of the transmission 10 proximate the dual clutch assembly 32.

Co-planar gear set 50 includes gear 52 and gear 54. Gear 52 is rotatably fixed and connected for common rotation with the second shaft or transmission input member 24 and intermeshes with gear 54. Gear 54 is selectively connectable for common rotation with the second countershaft member 28. Gear set 50 is positioned adjacent gear set 40. As will be described in further detail below, co-planar gear set 50 also includes a reverse gear 90.

Co-planar gear set 60 includes gear 62 and gear 64. Gear 62 is rotatably fixed and connected for common rotation with the first shaft or transmission input member 22 and intermeshes with gear 64. Gear 64 is selectively connectable for common rotation with the first countershaft member 26. Gear set 60 is disposed adjacent gear set 50.

Co-planar gear set 70 includes gear 72 and gear 74. Gear 72 is rotatably fixed and connected for common rotation with the first shaft or transmission input member 22 and intermeshes with gear 74. Gear 74 is selectively connectable for common rotation with the first countershaft member 26. Gear set 70 is located adjacent gear set 60.

Co-planar gear set 80 includes gear 82 and gear 84. Gear 82 is rotatably fixed and connected for common rotation with the first shaft or transmission input member 22 and intermeshes with gear 84. Gear 84 is selectively connectable for common rotation with the first countershaft member 26 and intermeshes with gear 82. Gear set 80 is positioned between gear set 70 and an end wall 88 of the transmission housing 19.

Reverse gear 90 is selectively connectable for common rotation with the first countershaft member 26. Reverse gear 90 is axially aligned with and intermeshes with gear 54 of gear set 50. Reverse gear 90 is located between gear set 60 and end wall 47.

Further, a first countershaft transfer gear 100 is rotatably fixed and connected for common rotation with the first countershaft member 26. A second countershaft transfer gear 110 is rotatably fixed and connected for common rotation with the second countershaft member 28. First countershaft transfer gear 100 is configured to mesh with output member 14 and the second countershaft transfer gear 110 is also configured to mesh with output member 14, however countershaft transfer gear 110 and countershaft transfer gear 100 do not mesh with each other. The first countershaft transfer gear 100 is located between the co-planar gear set 40 and end wall 47. The output gear 110 is located between the co-planar gear set 50 and end wall 47. The second countershaft transfer gear 110 is located between gear set 50 output member 14.

The transmission 10 further includes a plurality of selectively engageable synchronizer assemblies 150, 152, 154 and 156. Synchronizers 150 and 156 are a single sided synchronizer that generally includes a shift fork (not shown) that is bi-directionally translated by an actuator (not shown) into either an engaged position or a neutral or disengaged position. In the present embodiment, synchronizer 150 is selectively actuatable to connect reverse gear 90 for common rotation with the first countershaft member 26 and synchronizer 156 is selectively actuatable to connect gear 74 for common rotation with the second countershaft member 28. In a preferred embodiment, synchronizers 150, 156 have only one actuator.

Synchronizers 152 and 154 are double sided synchronizers and generally include a shift fork (not shown) that is bi-directionally translated by an actuator (not shown) into at least two engaged positions and a neutral or disengaged position. In the present embodiment, synchronizer 152 is selectively actuatable to connect for common rotation gear 44 with the second countershaft 28 and is selectively actuatable to connect for common rotation gear 54 with the second countershaft 28. Synchronizer 154 is selectively engageable to connect for common rotation gear 64 with the first countershaft member 26 and is selectively engageable to connect for common rotation gear 84 with the first countershaft member 26.

The transmission 10 is capable of transmitting torque from the input shaft 12 to the output gear 14 in at least five forward torque ratios and at least one reverse torque ratio. Each of the forward torque ratios and the reverse torque ratio is attained by selective engagement of the dual clutch assembly 32 and one or more of the synchronizer assemblies 150, 152, 154 and 156. Those skilled in the art will readily understand that a different speed ratio is associated with each torque ratio.

It should be appreciated that each individual gear set 40, 50, 60, 70 and 80 provides one or more forward and/or reverse gear ratios upon selective engagement of the synchronizer assemblies 150, 152, 154 and 156 and which synchronizer and which gear set are associated with a particular forward or reverse speed ratio may vary without departing from the scope of the present invention.

For example, to establish the reverse torque ratio, clutch element 38 is engaged to couple the clutch housing 34 with the second shaft or transmission input member 24 and synchronizer 150 is engaged to connect reverse gear 90 to the first countershaft member 26. More specifically, input torque from the input shaft 12 is transferred through the dual clutch assembly 32 to the second shaft or transmission input member 24, through gear 52 to gear 54, through gear 54 to reverse gear 90, from the first countershaft member 26 to first countershaft transfer gear 100 and from first countershaft transfer gear 100 to the output member 14.

To establish a first forward torque ratio (i.e. a 1st gear), clutch element 36 is engaged to couple the clutch housing 34 with the first shaft or transmission input member 22 and synchronizer 154 is activated to couple gear 80 to the first countershaft member 26. Input torque from the input member 12 is transferred through the dual clutch assembly 32 to the first shaft or transmission input member 22 to gear 82. Gear 82 transfers torque to gear 84 which transfers the torque to the first countershaft member 26 and to first countershaft transfer gear 100 and then from first countershaft transfer gear 100 to the output member 14.

To establish a second forward torque ratio (i.e. a 2nd gear), clutch element 38 is engaged to couple the clutch housing 34 to the second shaft or transmission input member 24 which rotates gear 42 and synchronizer 152 is activated to couple gear 44 to the second countershaft member 28. Accordingly, input torque from the input member 12 is transferred through the dual clutch assembly 32 to the second shaft or transmission input member 24, through gear 42 to gear 44, through the second countershaft member 28 to second countershaft transfer gear 110 and then from second countershaft transfer gear 110 to the output member 14.

To establish a third forward torque ratio (i.e. a 3rd gear), clutch element 36 is engaged to couple the clutch housing 34 to the first shaft or transmission input member 22 which rotates gear 62 and synchronizer 154 is activated to couple gear 64 to the first countershaft member 26. Thus, input torque from the input member 12 is transferred through the dual clutch assembly 32 to the first shaft or transmission input member 22, through gear 62 to gear 64, and through the first countershaft member 26 to first countershaft transfer gear 100 and then from first countershaft transfer gear 100 to the output member 14.

To establish a fourth forward torque ratio (i.e. a 4th gear), clutch element 38 is engaged to couple the clutch housing 34 to the second shaft or transmission input member 24 which rotates gear 52 and synchronizer 152 is activated to couple gear 54 to the second countershaft member 28. Thus, input torque from the input member 12 is transferred through the dual clutch assembly 32 to the second shaft or transmission input member 24 to gear 52, then to second countershaft member 28 through gear 54, then to second countershaft transfer gear 110 and then from second countershaft transfer gear 110 to the output member 14.

To establish a fifth forward torque ratio (i.e. a 5th gear), clutch element 36 is engaged to couple the clutch housing 34 to the first shaft or transmission input member 22 which rotates gear 72 and synchronizer 156 is engaged to couple gear 74 to the second countershaft member 28. Input torque from the input member 12 is transferred through the dual clutch assembly 32 to the first shaft or transmission input member 22, through gear 72 to gear 74, then through the second countershaft member 28 to second countershaft transfer gear 110 and then from second countershaft transfer gear 110 to the output member 14

Again, it should be appreciated that any one of the gear sets of gear sets 40, 50, 60, 70 and 80 may be changed to produce a certain forward and reverse torque ratio without departing from the scope of the present invention.

The present invention contemplates that a variety of torque ratios (i.e., the ratio of torque of the output member 14 to the input member 12) are achievable through the selection of tooth counts of the gears of the transmission 10. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a transmission housing;
a dual clutch assembly having a clutch housing connectable to a flywheel of an engine, wherein the clutch housing is rotationally supported within the transmission housing;
a first, second, third, fourth, and fifth gear sets, wherein the first gear set includes a first gear in mesh with a second gear, the second gear set includes a first gear in mesh with a second gear and a third gear in mesh with the second gear, the third gear set includes a first gear in mesh with a second gear, the fourth gear set includes a first gear in mesh with a second gear, the fifth gear set includes a first gear in mesh with a second gear;
a first transmission input member having a first end portion rotatably supported in the transmission housing and wherein each of the first gear of the third, fourth and fifth gear sets are rotatably fixed for common rotation with the first transmission input member;
a second transmission input member having a first end portion rotatably supported in the transmission housing, wherein each of the first gear of the first and second gear sets are rotatably fixed for common rotation with the second transmission input member and wherein the second transmission input member is concentric with the first transmission input member and at least partially surrounds the first transmission input member;
a first countershaft rotatably supported within the transmission housing and spaced apart from and parallel with the first and second transmission input members, wherein the third gear of the second gear set, the second gear of the third gear set and the second gear of the fifth gear set are each selectively connectable for common rotation with the first countershaft;
a second countershaft rotatably supported within the transmission housing and spaced apart from and parallel with the first and second transmission input members, wherein the second gear of the first gear set, the second gear of the second gear set and the second gear of the fourth gear set are each selectively connectable for common rotation with the second countershaft;
four synchronizer assemblies for selectively coupling at least one of the gears of the first, second, third, fourth and fifth gear sets with at least one of the first countershaft and the second countershaft, and
wherein the selective engagement of dual clutch assembly interconnects the dual clutch housing with at least one of the first and the second transmission input members and the selective engagement of at least one of the four synchronizer assemblies establishes at least one of five forward speed ratios.

2. The transmission of claim 1 wherein a first of the four synchronizer assemblies selectively connects the third gear of the second gear set to the first countershaft shaft.

3. The transmission of claim 2 wherein a second of the four synchronizer assemblies selectively connects at least one of the second gear of the first gear set and second gear of the second gear set to the second countershaft shaft.

4. The transmission of claim 3 wherein a third of the four synchronizer assemblies selectively connects at least one of the second gear of the third gear set and the second gear of the fifth gear set to the first countershaft shaft.

5. The transmission of claim 4 wherein a fourth of the four synchronizer assemblies selectively connects the second gear of the fourth gear set to the second countershaft shaft.

6. The transmission of claim 1 wherein the first gear set is adjacent the dual clutch assembly, the second gear set is adjacent the first gear set, the third gear set is adjacent the second gear set, the fourth gear set is adjacent the third gear set and the fifth gear set is between an end wall of the transmission housing and the fourth gear set.

7. The transmission of claim 1 wherein the dual clutch assembly includes a first clutch and a second clutch, wherein the second clutch is configured to selectively connect the clutch housing to the second transmission input member and wherein the four synchronizer assemblies includes a second synchronizer assembly for selectively connecting the second gear of the first gear set to the second countershaft to establish a second gear ratio.

8. The transmission of claim 7 wherein the second clutch of the dual clutch assembly is configured to selectively connect the clutch housing to the second transmission input member and wherein the second synchronizer of the four synchronizer assemblies includes is configured to selectively connect the second gear of the second gear set to the second countershaft to establish a fourth gear ratio.

9. The transmission of claim 8 wherein the second clutch of the dual clutch assembly is configured to selectively connect the clutch housing to the second transmission input member and wherein the first synchronizer assembly of the four synchronizer assemblies is configured to selectively connect the third gear of the second gear set to the first countershaft to establish a reverse gear ratio.

10. The transmission of claim 9 wherein the first clutch of the dual clutch is configured to selectively connect the clutch housing to the first transmission input member and wherein a third synchronizer assembly of the four synchronizer assemblies is configured to selectively connect the second gear of the fifth gear set to the first countershaft to establish a first gear ratio.

11. The transmission of claim 10 wherein the first clutch of the dual clutch is configured to selectively connect the clutch housing to the first transmission input member and wherein the third synchronizer assembly of the four synchronizer assemblies is configured to selectively connect the second gear of the third gear set to the first countershaft to establish a third gear ratio.

12. The transmission of claim 11 wherein the first clutch of the dual clutch is configured to selectively connect the clutch housing to the first transmission input member and wherein the fourth synchronizer assembly of the four synchronizer assemblies is configured to selectively connect the second gear of the fourth gear set to the second countershaft to establish a fifth gear ratio.

13. The transmission of claim 1 further comprising a first countershaft transfer gear fixed to the first countershaft for common rotation with the first countershaft and a second countershaft transfer gear fixed to the second countershaft for common rotation with the second countershaft and wherein the first and second countershaft transfer gears transfer torque from at least one of the first and second countershafts to the output member.

14. The transmission of claim 13 wherein the output member is a gear that meshes with the each of the first and second countershaft transfer gears.

15. A dual clutch transmission comprising:
a transmission housing;
a first, second, third, fourth, and fifth gear sets, wherein the first gear set includes a first gear in mesh with a second gear, the second gear set includes a first gear in mesh with a second gear and a third gear in mesh with the second gear, the third gear set includes a first gear in mesh with a second gear, the fourth gear set includes a first gear in mesh with a second gear, the fifth gear set includes a first gear in mesh with a second gear;
a first transmission input member having a first end and a second end portion rotatably supported in the transmission housing and wherein each of the first gear of the third, fourth and fifth gear sets are rotatably fixed for common rotation with the first transmission input member;
a second transmission input member having a first end portion rotatably supported in the transmission housing, wherein each of the first gear of the first and second gear sets are rotatably fixed for common rotation with the second transmission input member and wherein the second transmission input member is concentric with the first transmission input member and at least partially surrounds the first transmission input member;

a dual clutch assembly having a clutch housing connectable to a flywheel of an engine, a first clutch configured to selectively connect the clutch housing to the first transmission input member and a second clutch configured to selectively connect the clutch housing to the second transmission input member and wherein the clutch housing is rotationally supported within the transmission housing;

a first countershaft rotatably supported within the transmission housing and spaced apart from and parallel with the first and second transmission input members, wherein the third gear of the second gear set, the second gear of the third gear set and the second gear of the fifth gear set are each selectively connectable for common rotation with the first countershaft;

a second countershaft rotatably supported within the transmission housing and spaced apart from and parallel with the first and second transmission input members, wherein the second gear of the first gear set, the second gear of the second gear set and the second gear of the fourth gear set are each selectively connectable for common rotation with the second countershaft;

a first synchronizer assembly configured to selectively connect the third gear of the second gear set to the first countershaft to establish a reverse gear ratio when the second clutch of the dual clutch assembly is engaged to connect the clutch housing of the dual clutch to the second transmission input member;

a second synchronizer configured to selectively connect the second gear of the first gear set to the second countershaft to establish a second gear ratio and the second gear of the second gear set to the second countershaft to establish a fourth gear ratio when the second clutch of the dual clutch assembly is engaged to connect the clutch housing of the dual clutch to the second transmission input member;

a third synchronizer assembly configured to selectively connect the second gear of the fifth gear set to the first countershaft to establish a first gear ratio and the second gear of the third gear set to the first countershaft to establish a third gear ratio when the first clutch of the dual clutch assembly is engaged to connect the clutch housing of the dual clutch to the first transmission input member; and a fourth synchronizer assembly configured to selectively connect the second gear of the fourth gear set to the second countershaft to establish a fifth gear ratio when the first clutch of the dual clutch assembly is engaged to connect the clutch housing of the dual clutch to the first transmission input member.

* * * * *